(12) United States Patent
Seino

(10) Patent No.: US 10,348,623 B2
(45) Date of Patent: Jul. 9, 2019

(54) COMMUNICATION SYSTEM, CONTROL APPARATUS, CONTROL METHOD AND PROGRAM

(71) Applicant: NEC Corporation, Tokyo (JP)

(72) Inventor: Kakeru Seino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/560,065

(22) PCT Filed: Mar. 23, 2016

(86) PCT No.: PCT/JP2016/059151
§ 371 (c)(1),
(2) Date: Sep. 20, 2017

(87) PCT Pub. No.: WO2016/152903
PCT Pub. Date: Sep. 29, 2016

(65) Prior Publication Data
US 2018/0083873 A1   Mar. 22, 2018

(30) Foreign Application Priority Data
Mar. 24, 2015   (JP) .................................. 2015-060474

(51) Int. Cl.
| H04L 12/721 | (2013.01) |
| H04L 12/931 | (2013.01) |
| H04L 12/46  | (2006.01) |
| H04L 12/935 | (2013.01) |

(52) U.S. Cl.
CPC .......... *H04L 45/66* (2013.01); *H04L 12/4641* (2013.01); *H04L 49/30* (2013.01); *H04L 49/70* (2013.01)

(58) Field of Classification Search
CPC ..... H04L 45/66; H04L 12/4641; H04L 49/30; H04L 49/70
See application file for complete search history.

(56) References Cited

U.S. PATENT DOCUMENTS 8,149,834 B1 * 4/2012 Nielsen ................... H04L 49/70
370/392
8,792,388 B2   7/2014 Yamato et al.
(Continued)

FOREIGN PATENT DOCUMENTS

| EP | 2693708 A1 | 2/2014 |
| EP | 2940937 A1 | 11/2015 |

(Continued)

OTHER PUBLICATIONS

International Search Report corresponding to PCT/JP2016/059151, 2 pages, dated Jun. 14, 2016.

(Continued)

*Primary Examiner* — Paul H Masur
(74) *Attorney, Agent, or Firm* — Wilmer Cutler Pickering Hale and Dorr LLP

(57) ABSTRACT

A communication system includes: a first forwarding apparatus located at an end point of a network, a second forwarding apparatus located at an end point of the network, and a control apparatus that constructs a virtual network by controlling the first and second forwarding apparatuses. The control apparatus sets in the first forwarding apparatus, a first processing rule such that, when the first forwarding apparatus receives a packet into which is inserted a first tag including an identifier for identifying the virtual network, the first forwarding apparatus inserts a second tag into the received packet and sends the received packet from a prescribed port. The control apparatus sets, in the second forwarding apparatus, a second processing rule such that, when the second forwarding apparatus receives the packet into which is inserted the second tag, the second forwarding apparatus removes the second tag and sends from a prescribed port.

6 Claims, 8 Drawing Sheets

(56) References Cited

U.S. PATENT DOCUMENTS

| | | | |
|---|---|---|---|
| 9,608,908 B2 | 3/2017 | Yoshida et al. | |
| 2005/0180391 A1 | 8/2005 | Shimada | |
| 2011/0261723 A1 | 10/2011 | Yamato et al. | |
| 2012/0275328 A1* | 11/2012 | Iwata | H04L 69/324 370/252 |
| 2013/0336331 A1* | 12/2013 | Woerndle | H04L 12/4641 370/409 |
| 2014/0016647 A1 | 1/2014 | Yoshida et al. | |
| 2014/0059537 A1* | 2/2014 | Kamble | G06F 9/45558 718/1 |
| 2014/0119189 A1 | 5/2014 | Lin | |
| 2014/0280838 A1 | 9/2014 | Finn et al. | |
| 2015/0188812 A1 | 7/2015 | Zheng | |
| 2015/0334032 A1 | 11/2015 | Aida et al. | |

FOREIGN PATENT DOCUMENTS

| | | |
|---|---|---|
| JP | 2003-169082 A | 6/2003 |
| JP | 2003-273893 A | 9/2003 |
| WO | WO-2004/095780 A1 | 11/2004 |
| WO | WO-2011/043379 A1 | 4/2011 |
| WO | WO-2012/133060 A1 | 10/2012 |
| WO | WO-2014/040551 A1 | 3/2014 |
| WO | WO-2014/104277 A1 | 7/2014 |

OTHER PUBLICATIONS

OpenFlow Switch Specification Version 1.1.0. Implemented (Wire Protocol 0x02), Feb. 28, 2011, [online], [Search performed on Mar. 9, 2015], Internet; 56 pages.

Nick McKeown, et al., "OpenFlow: Enabling Innovation in Campus Networks", Mar. 14, 2008, [online], [Search performed on Mar. 9, 2015], Internet, 6 pages.

Yamanaka et al., Proposal of a Method for Building Virtual OpenFlow Networks on Wide-Area Physical Networks, IEICE Technical Report, Sep. 5, 2013, vol. 113, No. 205, 8 pages.

Extended European Search Report issued by the European Patent Office for European Application No. 16768806.8 dated Oct. 4, 2018 (10 pages).

* cited by examiner

FIG. 6

PROCESSING RULE OF FORWARDING APPARATUS 30-1

| Match Field | Instructions |
|---|---|
| VLAN ID = 100<br>OTHER FIELDS ARE WILDCARDS | INSERT VLAN TRANSPARENT TAG<br>(VTID=ID1)<br>FORWARD FROM PORT P1 |
| VTID = ID1<br>OTHER FIELDS ARE WILDCARDS | REMOVE VLAN TRANSPARENT TAG<br>FORWARD FROM PORT P3 |
| ... | ... |

COMMUNICATION SYSTEM, CONTROL APPARATUS, CONTROL METHOD AND PROGRAM

CROSS-REFERENCE TO RELATED APPLICATIONS

This application is a national stage application of International Application No. PCT/JP2016/059151 entitled "COMMUNICATION SYSTEM, CONTROL APPARATUS, CONTROL METHOD AND PROGRAM," filed on Mar. 23, 2016, which claims the benefit of the priority of Japanese Patent Application No. 2015-060474 filed on Mar. 24, 2015, the disclosures of each of which are hereby incorporated by reference in their entirety. The present invention relates to a communication system, a control apparatus, a control method and a program. In particular, the invention relates to a communication system in which a virtual network is formed on a physical network, a control apparatus, a control method and a program.

TECHNICAL FIELD

Background

In recent years there is increasing usage of SDN (Software Defined Networks) that change network configuration through software setting, without changing hardware configuration. Non-Patent Literatures (NPLs) 1 and 2 propose technology known as OpenFlow, in which control apparatuses (controllers) and forwarding apparatuses (switches) that support this OpenFlow are widely used. In OpenFlow, communication is taken as end-to-end flow, and path control, failure recovery, load balancing, and optimization are performed on a per-flow basis.

An OpenFlow switch as specified in Non-Patent Literature 2 is provided with a secure channel for communication with an OpenFlow controller, and operates according to a flow table in which addition or rewriting is instructed as appropriate by the OpenFlow controller. In the flow table, for each flow there are definitions of sets of match conditions (Match Fields) for collation with packet headers, flow statistical information (Counters), and instructions (Instructions) that define processing content (refer to "4.1 Flow Table" in Non Patent Literature 2).

With regard to configuring a VLAN (Virtual Local Area Network), Patent Literatures (PTLs) 1 and 2 disclose assigning a tag (VLAN tag) including VLAN identifier to an Ethernet (registered trademark; the same applies below) frame.

[PTL 1] Japanese Patent Kokai Publication No. JP2003-273893A
[PTL 2] Japanese Patent Kokai Publication No. JP2003-169082A
[NPL 1] Nick McKeown and seven others, "OpenFlow: Enabling Innovation in Campus Networks", [online], [Search performed on Mar. 9, 2015], Internet www.openflow.org/documents/openflow-wp-latest.pdf
[NPL 2] "OpenFlow Switch Specification" Version 1.1.0. Implemented (Wire Protocol 0x02), [online], [Search performed on Mar. 9, 2015], Internet www.openflow.org/documents/openflow-spec-v1.1.0.pdf

SUMMARY

It is to be noted that the respective disclosures of the abovementioned cited patent literature are incorporated herein by reference thereto. The following analysis is given according to the present inventors.

By using control apparatuses and forwarding apparatuses to which OpenFlow technology is applied, a user can build a virtual network on a physical network. Specifically, forwarding apparatuses in a physical network corresponding to appliances, virtual switches and virtual routers of a virtual network, are controlled to realize the virtual network that is built. That is, a forwarding apparatus does not autonomously control communication (does not control flow), but controls communication in accordance with settings (processing rules, flow table) from a control apparatus.

Here, it is desired to build a virtual network passing over a network domain (topology). As a result of investigation, the investors have come to the perception that this desire can be realized according to the following technique. It is to be noted that with the technology of Patent Literatures 1 and 2 a virtual network is built within networks provided by the same telecommunications carrier, and one virtual network cannot be built between different networks even if Patent Literatures 1 and 2 are applied.

For example, the control apparatus controls a forwarding apparatus located at an end point of a network domain as follows. The control apparatus changes a VLAN tag existing between an Ethernet frame transmission source MAC address and payload when a forwarding apparatus located at the end point receives a packet matching a port and a VLAN ID performing inter-VLAN communication, to a tag including a virtual network ID and a virtual forwarding apparatus ID (rewrites a VLAN tag), and sets in the forwarding apparatus a forwarding rule to forward the packet including the VLAN after being changed, to another forwarding apparatus within the network domain. It is to be noted that the virtual forwarding apparatus is a forwarding apparatus within the network domain, and the control apparatus is an apparatus treated as a forwarding apparatus realizing the virtual network.

On receiving the packet including the above changed VLAN tag, the forwarding apparatus within the network domain forwards the packet in question to another forwarding apparatus in accordance with the changed VLAN. Ultimately, the packet arrives at another forwarding apparatus located at an end point of the network.

If the above changed VLAN tag is received, the control apparatus sets a processing rule for rewriting the changed VLAN tag to the VLAN tag before being changed, in the other forwarding apparatus located at the end point of the network domain. The other forwarding apparatus forwards the packet having the VLAN tag rewritten to the initial VLAN tag content, to another domain.

As described above, it is possible to realize communication between VLANs passing over a domain, by a processing rule set in 2 forwarding apparatuses located at network domain end points.

Here, in realizing the abovementioned control, the control apparatus and the forwarding apparatuses each hold table information, and it is necessary to perform processing in accordance with the table information. For example, the forwarding apparatuses hold a table associating VLAN IDs that perform communication among VLANs, virtual network ID, virtual forwarding apparatus IDs, and forwarding ports, and it is necessary to perform processing to change a VLAN tag to a tag including the virtual network ID and the virtual forwarding apparatus ID.

With such processing, there are few problems if the number of packets to be processed is small, but in a case of processing a very large number of packets, there is a problem in that processing loads in forwarding apparatuses become large.

It is an object of the present invention to provide a communication system, a control apparatus, a control method and a program, which reduce the processing load of forwarding apparatuses and the like, when communication is realized between VLANs passing over a network domain.

According to a first aspect of the present invention, a communication system includes: first and second forwarding apparatuses located at end points of a network, and a control apparatus that controls the first and second forwarding apparatuses and constructs a virtual network; wherein the control apparatus sets in the first forwarding apparatus, a first processing rule such that, when the first forwarding apparatus receives a packet into which is inserted a first tag including an identifier for identifying the virtual network, the first forwarding apparatus inserts a second tag into the received packet and sends the received packet from a prescribed port, and, sets in the second forwarding apparatus, a second processing rule such that, when the second forwarding apparatus receives the packet into which is inserted the second tag, the second forwarding apparatus removes the second tag and sends from a prescribed port.

According to a second aspect of the present invention, a control apparatus configured to construct a virtual network by controlling a first forwarding apparatus located at an end point of a network and a second forwarding apparatus located at an end point of the network, sets: in the first forwarding apparatus, a first processing rule such that, when the first forwarding apparatus receives a packet into which is inserted a first tag including an identifier for identifying the virtual network, the first forwarding apparatus inserts a second tag into the received packet and sends the received packet from a prescribed port, and, in the second forwarding apparatus, a second processing rule such that, when the second forwarding apparatus receives the packet into which is inserted the second tag, the second forwarding apparatus removes the second tag and sends from a prescribed port.

According to a third aspect of the present invention, a control method for a control apparatus configured to construct a virtual network by controlling a first forwarding apparatus located at an end point of a network and a second forwarding apparatus located at an end point of the network, includes: setting, in the first forwarding apparatus, a first processing rule such that, when the first forwarding apparatus receives a packet into which is inserted a first tag including an identifier for identifying the virtual network, the first forwarding apparatus inserts a second tag into the received packet and sends the received packet from a prescribed port, and setting, in the second forwarding apparatus, a second processing rule such that, when the second forwarding apparatus receives the packet into which is inserted the second tag, the second forwarding apparatus removes the second tag and sends from a prescribed port.

According to a fourth aspect of the present invention, a program executes, on a computer installed in a control apparatus configured to construct a virtual network by controlling a first forwarding apparatus located at an end point of a network and a second forwarding apparatus located at an end point of the network, a process that sets, in the first forwarding apparatus, a first processing rule such that, when the first forwarding apparatus receives a packet into which is inserted a first tag including an identifier for identifying the virtual network, the first forwarding apparatus inserts a second tag into the received packet and sends the received packet from a prescribed port, and a process that sets, in the second forwarding apparatus, a second processing rule such that, when the second forwarding apparatus receives the packet into which is inserted the second tag, the second forwarding apparatus removes the second tag and sends from a prescribed port. It is to be noted that this program may be recorded on a computer-readable storage medium. The storage medium may be non-transient, such as a semiconductor memory, a hard disk, a magnetic recording medium, an optical recording medium or the like. The present invention may also be embodied as a computer program product.

According to respective viewpoints of the present invention, there are provided a communication system, a control apparatus, a control method and a program, which contribute to reducing processing load on forwarding apparatuses and the like, when communication is realized between VLANs passing over a network domain.

BRIEF DESCRIPTION OF DRAWINGS

FIG. 6 is a diagram showing an example of a flow table contained in a storage unit of the forwarding apparatus.

PREFERRED MODES

Figure 1:
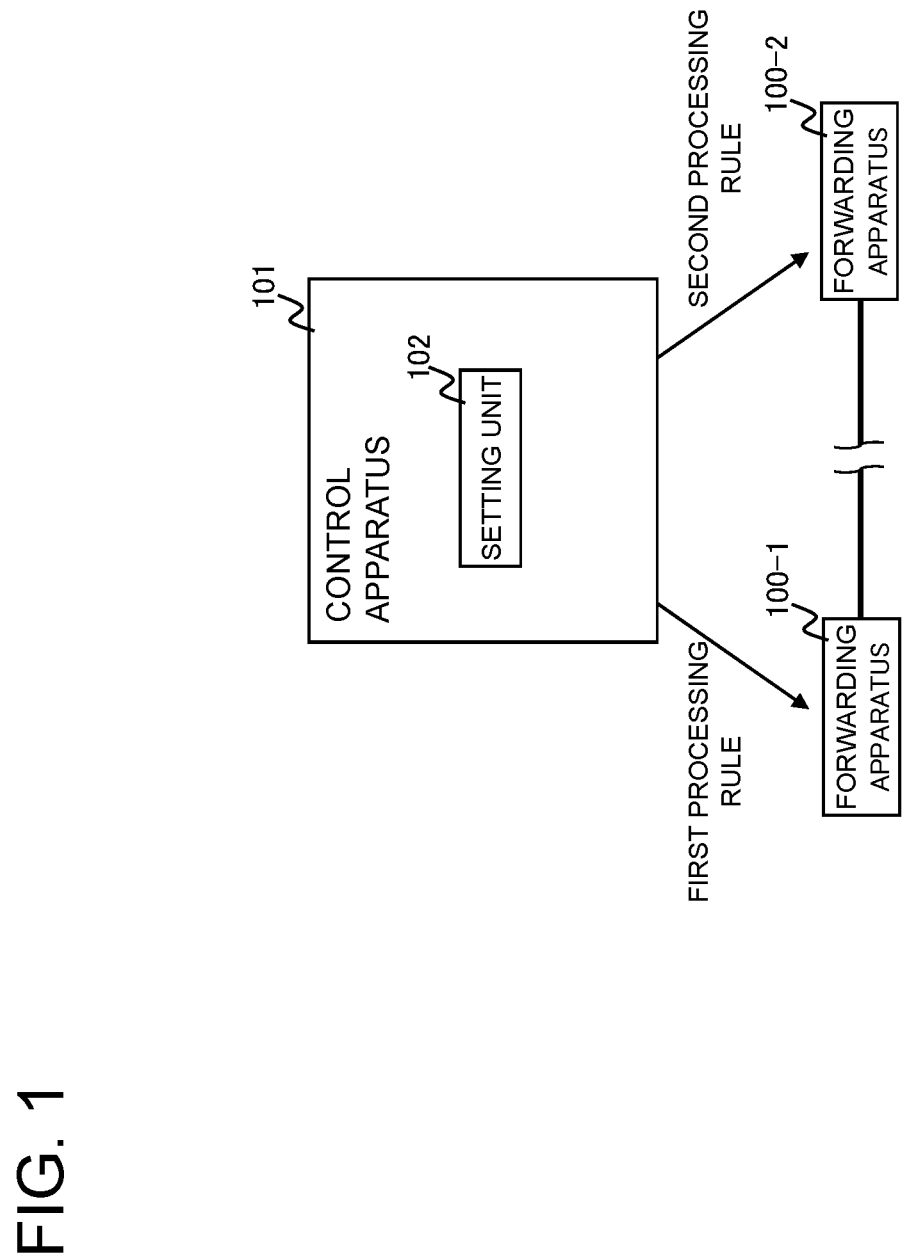
FIG. 1 is a diagram for describing an outline of an exemplary embodiment.

First, a description is given concerning an outline of an exemplary embodiment. It is to be noted that reference symbols in the drawings attached to this outline are added to respective elements for convenience, as examples in order to aid understanding, and the description of this outline is not intended to limit the invention in any way.

A communication system according to the first exemplary embodiment includes: a first forwarding apparatus 100-1 located at an end point of a network, a second forwarding apparatus 100-2 located at an end point of a network, and a control apparatus 101 that constructs a virtual network by controlling the first and second forwarding apparatuses (refer to FIG. 1). The control apparatus 101 is provided with a setting unit 102 that sets, in the first forwarding apparatus 100-1, a first processing rule such that, when the first forwarding apparatus 100-1 receives a packet into which is inserted a first tag (for example a VLAN tag) including an identifier for identifying the virtual network, the first forwarding apparatus 100-1 inserts a second tag (for example a VLAN transparent tag) into the received packet and sends the received packet from a prescribed port; and sets, in the second forwarding apparatus 100-2, a second processing rule such that, when the second forwarding apparatus 100-2 receives the packet into which is inserted the second tag, the second forwarding apparatus 100-2 removes the second tag and sends from a prescribed port.

On receiving a packet in which a VLAN tag is set in a header, where the VLAN tag is for identifying a virtual network for performing communication between VLANs, the first forwarding apparatus 100-1, in which the first processing rule is set, inserts a tag (VLAN transparent tag described later) including the ID of a virtual forwarding apparatus between a transmission source MAC address and a VLAN tag, for example, and forwards the packet in question from a prescribed port. A forwarding apparatus that receives the packet forwards the packet to the second forwarding apparatus 100-2. The second forwarding apparatus 100-2, in which the second processing rule is set, removes the tag including the virtual forwarding apparatus ID and forwards the packet from the prescribed port.

As a result of the above control, even where various networks (domains, topologies) exist between virtual networks having the same VLAN ID (VLAN networks), a virtual network that easily jumps over (does not go through) an intermediate network is built. That is, the control apparatus 101 functions as a VLAN transparent control apparatus. In the communication system shown in FIG. 1, it is sufficient if VLAN ID(s) performing communication between VLANs and corresponding ports thereof, and virtual forwarding apparatus IDs are stored. Unlike the abovementioned example, a VLAN tag change is unnecessary, and by load processing that is lighter than inserting a VLAN transparent tag into a packet, it is possible to build a virtual network extending over a plurality of network domains.

A more detailed description is given concerning specific exemplary embodiments below, making reference to the drawings. It is to be noted that in each of the exemplary embodiments the same symbols are attached to the same configuration elements and descriptions thereof are omitted.

First Exemplary Embodiment

A more detailed description is given concerning a first exemplary embodiment, using the drawings.
<Communication System Configuration>

Figure 2:
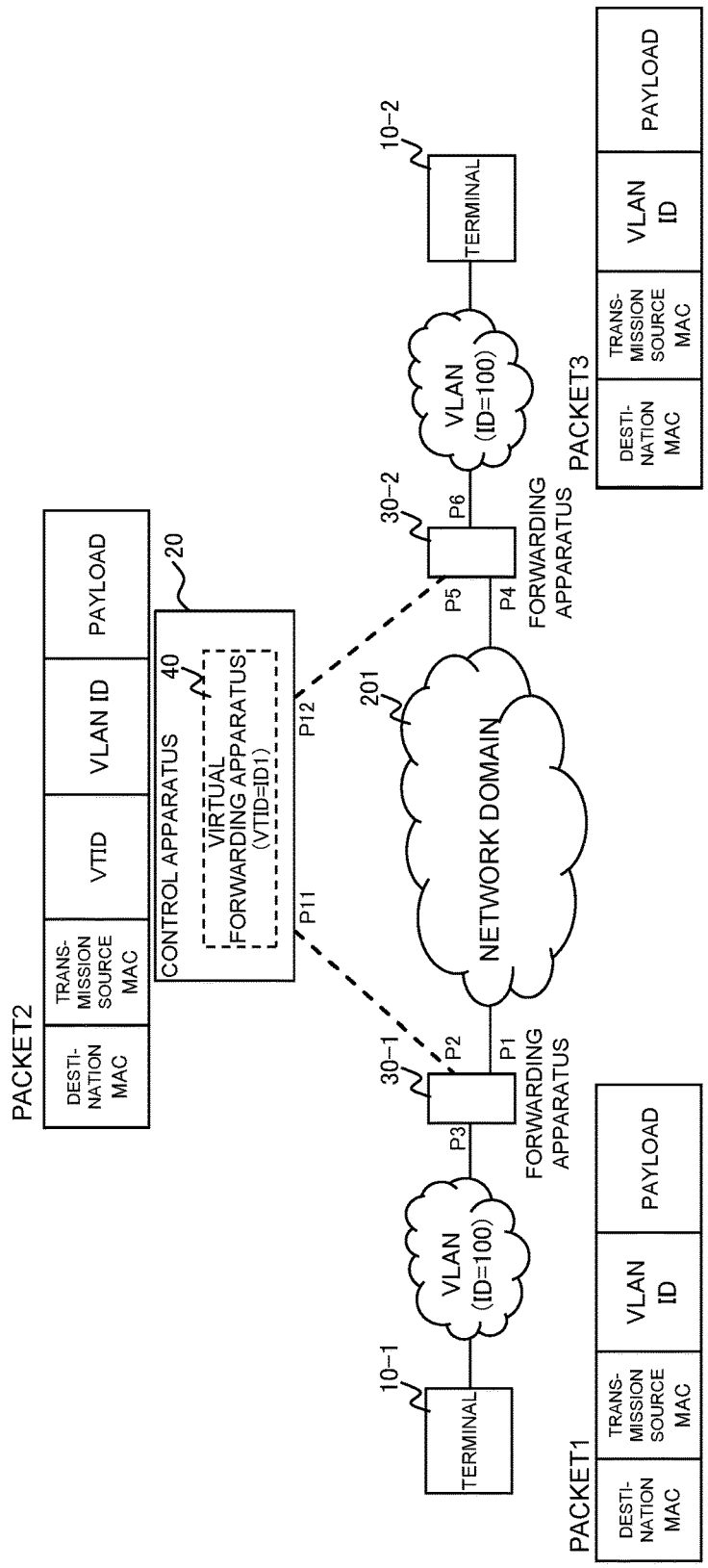
FIG. 2 is a diagram showing an example of a schematic configuration of the communication system according to a first exemplary embodiment.

FIG. 2 is a diagram showing an example of a schematic configuration of the communication system according to the first exemplary embodiment. Referring to FIG. 2, the communication system is configured to include terminals 10-1 and 10-2, a control apparatus 20, and forwarding apparatuses 30-1 and 30-2.

The terminals 10 are information processing apparatuses utilized by a user, and transmission and reception of packets are carried out between terminal 10-1 and terminal 10-2, for example. The control apparatus 20 corresponds to an OpenFlow controller, and the forwarding apparatus 30 is a switch that forwards packets and corresponds to an OpenFlow switch. However, protocols applied to the control apparatus 20 and the forwarding apparatuses 30 are not limited to the OpenFlow protocol. It is possible to use not only the control apparatus 20 and the forwarding apparatuses 30 using an OpenFlow controller or an OpenFlow switch, but also a server or information processing apparatus (PC: personal computer) having equivalent functions.

The control apparatus 20 builds an independent network (virtual network; VLAN) on a physical network. In the example of FIG. 2, the control apparatus 20 builds the virtual network in which the identifier (ID) is set to 100. It is to be noted that the control apparatus 20 can build a plurality of virtual networks on a physical network, but in the first exemplary embodiment, to facilitate understanding, one virtual network is built.

The virtual network on the physical network shown in FIG. 2 is configured to extend over a network domain (topology) on the terminal 10-1 side, and a network domain on the terminal 10-2 side.

The forwarding apparatuses 30-1 and 30-2 are each forwarding apparatuses located at end points (edges) of network domains to which they themselves belong. That is, the forwarding apparatuses 30-1 and 30-2 are located at network extremities and operate as connection nodes with other networks. Since the forwarding apparatuses 30-1 and 30-2 are located at end points, they have at least a port connected to a forwarding apparatus inside a network to which they themselves belong (ports P1 and P4 in the example of FIG. 2), and a port connected to another network (ports P3 and P6). It is to be noted that the forwarding apparatuses 30-1 and 30-2 each also have a port (P2, P5) for communicating with the control apparatus 20.

The control apparatus 20 has a function to set a processing rule in forwarding apparatuses included in a network domain 201, including forwarding apparatuses 30-1 and 30-2, in order to realize communication between VLANs passing over the network domain 201. It is to be noted that the control apparatus 20 sets processing rules in forwarding apparatuses located inside the network domain 201, and handles the forwarding apparatuses located inside the network as a virtual forwarding apparatus 40. The virtual forwarding apparatus 40 corresponds to an L2 (Layer 2) switch in a network built by a virtual network.
<Outline of Operations of the Communication System>

Next a description is given of an outline of operations of the communication system, making reference to FIG. 2.

When the terminal 10-1 transmits a packet (a packet contained in the virtual network) to the terminal 10-2, the packet in question arrives at the forwarding apparatus 30-1. At this occasion, the forwarding apparatus 30-1 receives the packet, in which a VLAN tag, in which a VLAN ID (VLAN ID=100 in the example of FIG. 2) is set, is inserted between transmission source MAC (Media Access Control) address and payload (refer to packet 1 in FIG. 2).

On receiving the packet, the forwarding apparatus 30-1 refers to the processing rule set by the control apparatus 20 and executes processing on the received packet. In the forwarding apparatus 30-1, for example, receiving a packet in which VLAN=100 is set, is set as a match condition. If packet 1 shown in FIG. 2 satisfies the above match condition, the forwarding apparatus 30-1 inserts a tag including an identifier of the virtual forwarding apparatus 40, between the VLAN tag and transmission source MAC address of packet 1.

It is to be noted that in the first exemplary embodiment, the identifier of the virtual forwarding apparatus 40 is expressed as VTID (Virtual Transport ID), and the tag including the VTID (identifier of the virtual forwarding apparatus 40) is described as a VLAN transparent tag. The value of the identifier (VTID) of the virtual forwarding apparatus 40 is ID1.

The forwarding apparatus 30-1 forwards the packet, in which the VLAN transparent tag is inserted into packet 1 (packet 2 in FIG. 2), to another forwarding apparatus included in the network domain 201. The abovementioned packet 2 is sent to a forwarding apparatus located in the network domain 201.

The forwarding apparatus in question confirms the ID (VTID) set in the VLAN transparent tag included in the received packet, refers to a table in which the VTID and packet transmission destination are associated, and outputs the received packet (packet 2) from an appropriate port. The packet in which the VLAN transparent tag is inserted arrives at the forwarding apparatus 30-2 via a forwarding apparatus (forwarding apparatus that the control apparatus 20 treats as the virtual forwarding apparatus 40) located within the network domain 201.

The forwarding apparatus 30-2 receives the packet transmitted by the virtual forwarding apparatus 40 by port P4. On receiving the packet, the forwarding apparatus 30-2 refers to the processing rule set by the control apparatus 20 and executes processing on the received packet. In the forwarding apparatus 30-2, for example, reception of a packet in which a VLAN transparent tag is inserted, is set as a match condition. On receiving a packet matching the abovementioned match condition, the forwarding apparatus 30-2 removes the inserted VLAN transparent tag and outputs from port P6 (transmits packet 3 to terminal 10-2).

<Configuration of Control Apparatus>

Figure 3:
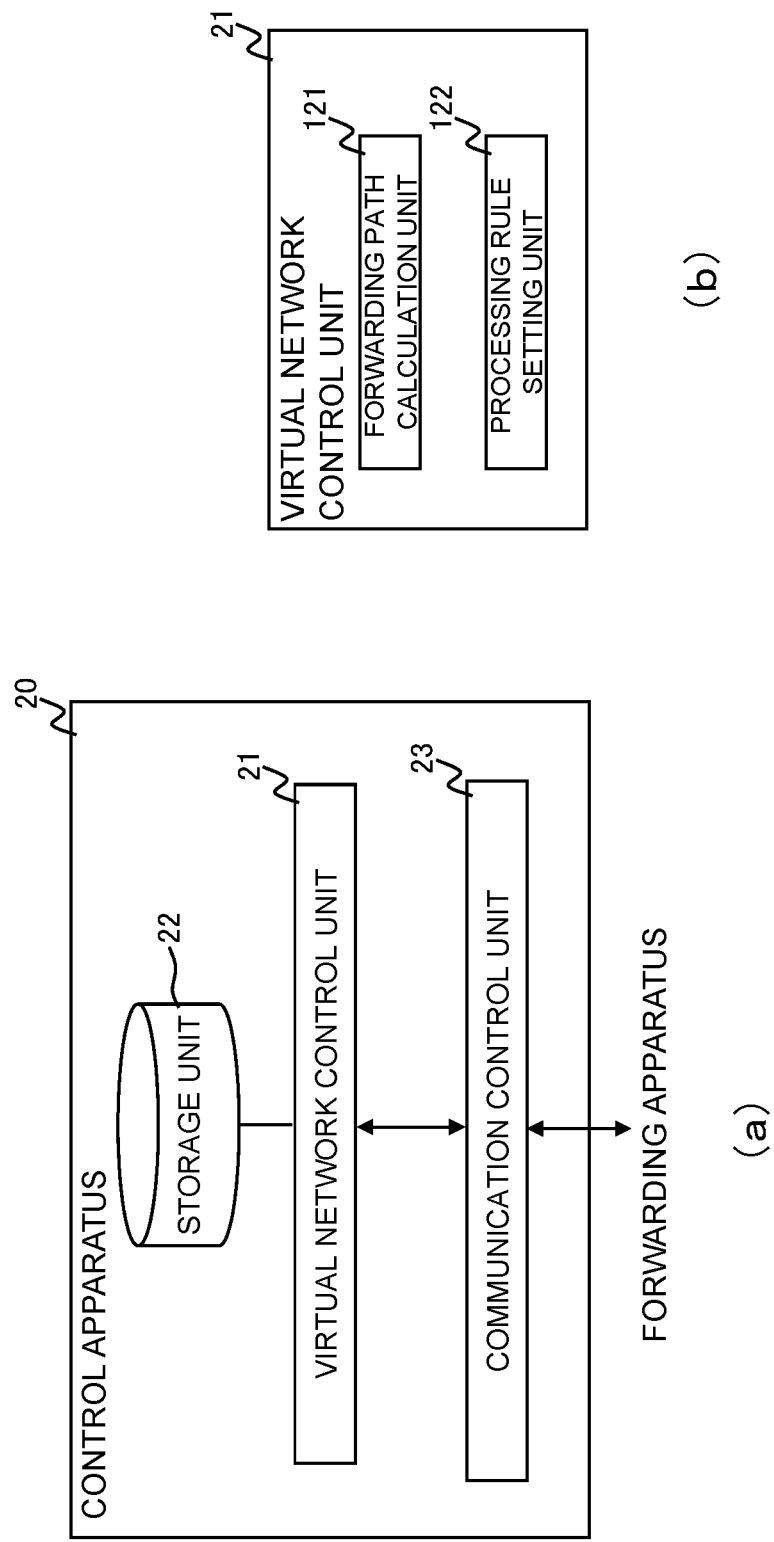
FIG. 3 is a diagram showing an example of an internal configuration of a control apparatus.

FIG. 3 is a diagram showing an example of an internal configuration of the control apparatus 20. Referring to FIG. 3A, the control apparatus 20 is configured to include a virtual network control unit 21, a storage unit 22, and a communication control unit 23.

The virtual network control unit 21 is a means for building a virtual network on a physical network formed of a forwarding apparatus included in the communication system, and for controlling the virtual network. More specifically, the virtual network control unit 21 performs mapping of the virtual network on the physical network and performs required calculation of forwarding path and setting of a processing rule. It is to be noted that the virtual network control unit 21 obtains information of a virtual network desired to be built in the communication system, from the manager of the communication system.

The virtual network control unit 21 calculates a packet forwarding path for realizing configuration of an inputted virtual network, based on the inputted information and information related to the physical network (for example, information related to links among forwarding apparatuses). The virtual network control unit 21 stores the calculated path in the storage unit 22, and also sets processing rule(s) in the forwarding apparatus(s) on the calculated path. For example, the virtual network control unit 21 calculates a processing rule including a match condition for identifying a packet contained in the virtual network, and processing (instruction; for example, designation of a forwarding port) of a packet matching the match condition, and sets the rule in respective forwarding apparatuses.

The virtual network control unit 21 sets the processing rule for realizing communication among VLANs passing over the network domain, in forwarding apparatuses located at end points of respective domains. Specifically, a processing rule is calculated that includes a match condition for identifying a virtual network, and processing (insertion of a VLAN transparent tag, forwarding from a designated port) for a packet matching the match condition, and the processing rule is set in forwarding apparatuses 30-1 and 30-2 located at domain end points.

It is to be noted that in the description below, a processing rule for realizing communication between VLANs passing over a network domain is described as a processing rule for VLAN transparent setting, or simply VLAN transparent setting. In the example shown in FIG. 2, the virtual network control unit 21 performs setting for VLAN transparent setting in the forwarding apparatus 30-1 and forwarding apparatus 30-2. Specific content of the VLAN transparent setting for setting in the forwarding apparatuses 30-1 and 30-2 is described later.

In addition, the virtual network control unit 21 calculates a processing rule(s) set in a forwarding apparatus(s) included in the network domain 201 outside of the forwarding apparatuses 30-1 and 30-2, and sets the calculated processing rule in the forwarding apparatus(s) in question. The virtual network control unit 21 has a function for calculating a processing rule for realizing the virtual forwarding apparatus 40, and setting the rule in a forwarding apparatus included in the network domain 201. Specifically, in a case of receiving a packet in which a VLAN transparent tag is set, the virtual network control unit 21 sets the processing rule for forwarding the packet from a prescribed port, in the forwarding apparatus, and realizes the virtual forwarding apparatus 40.

As described above, the virtual network control unit 21 includes a means (forwarding path calculation unit 121) for calculating a forwarding path required for building the virtual network, and a means (processing rule setting unit 122) that sets the calculated processing rule (including VLAN transparent setting) in each forwarding apparatus 30 (refer to FIG. 3B).

The communication control unit 23 is a means to control communication between the control apparatus 20 and the forwarding apparatus 30. On receiving a packet, the communication control unit 23 delivers the packet to the virtual network control unit 21.

Figure 4:
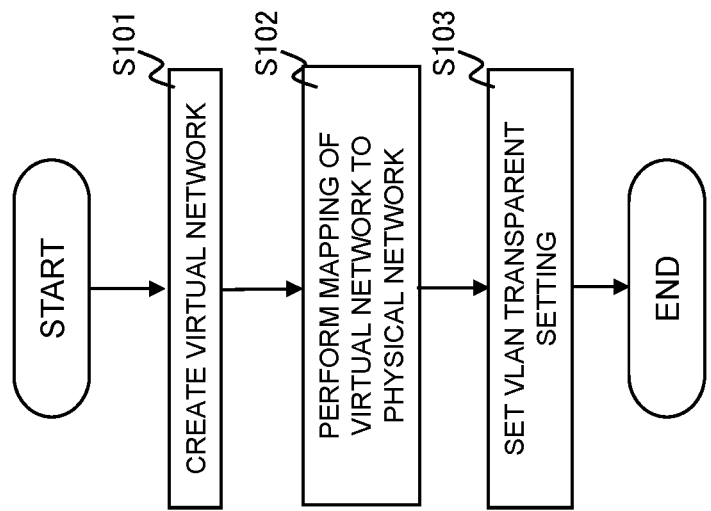
FIG. 4 is a flowchart showing an example of operations of the control apparatus.

Operations of the control apparatus 20 are consolidated in the flowchart shown in FIG. 4.

In step S101, the virtual network control unit 21 creates a virtual network.

In step S102, the virtual network control unit 21 performs a mapping of the created virtual network to a physical network. Specifically, the virtual network control unit 21 sets required processing rules for each forwarding apparatus.

In step S103, the virtual network control unit 21 creates a VLAN transparent setting to be set in a forwarding apparatus located at a domain end point, and performs setting in each forwarding apparatus.

It is to be noted that the virtual network control unit 21 can be implemented by a computer program that executes the abovementioned processing in a computer installed in the control apparatus 20, using hardware thereof.

<Configuration of Forwarding Apparatus>

Figure 5:
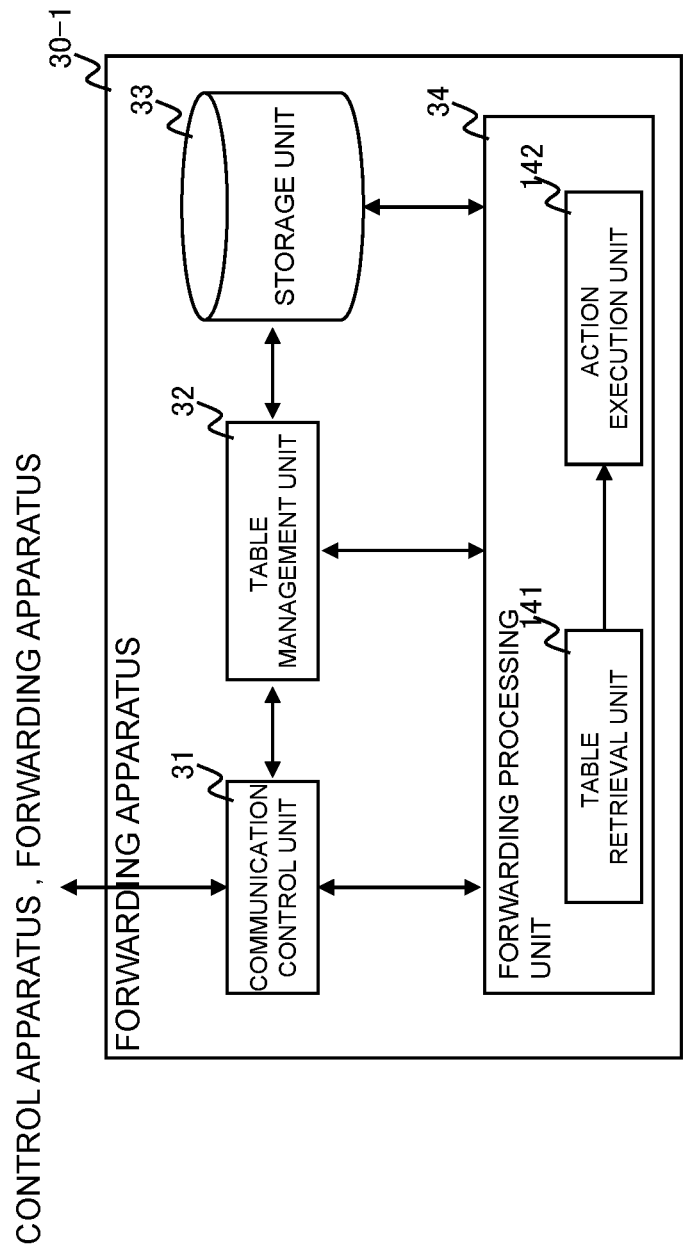
FIG. 5 is a diagram showing an example of an internal configuration of a forwarding apparatus.

FIG. 5 is a diagram showing an example of an internal configuration of the forwarding apparatus 30-1. Referring to FIG. 5, the forwarding apparatus 30-1 is configured to include a communication control unit 31, a table management unit 32, a storage unit 33 and a forwarding processing unit 34. It is to be noted that since the forwarding apparatus 30-1 corresponds to an OpenFlow switch, if an unknown packet is received it has a function of requesting the control apparatus 20 to set a processing rule for the packet in question, but a detailed description thereof is omitted. Since the forwarding apparatus 30-2 has a configuration similar to the forwarding apparatus 30-1, a description of a configuration related to the forwarding apparatus 30-2 and operations thereof is omitted.

The communication control unit 31 is a means for controlling communication between the control apparatus 20 and another forwarding apparatus. On receiving a packet or message, the communication control unit 31 distributes the packet or message to the table management unit 32 or the forwarding processing unit 34 in accordance with content thereof.

The table management unit 32 is a means for managing a table held by the storage unit 33. More specifically, the table management unit 32 registers or updates processing rules indicated by the control apparatus 20 in the storage unit 33.

The storage unit 33 is a storage means that can store 1 or more tables referred to when the forwarding processing unit 34 performs processing of a received packet.

The forwarding processing unit 34 is configured to include a table retrieval unit 141 and an action execution unit 142.

The table retrieval unit 141 is a means for retrieving a processing rule having a match condition (match field) that matches a received packet, from a table stored in the storage unit 33.

The action execution unit 142 is a means for performing packet processing in accordance with processing content (for example, packet editing, determination of forwarding destination, determination of forwarding port or the like) indicated in an instruction field of the processing rule retrieved by the table retrieval unit 141. Specifically, the action execution unit 142 performs processing such as insertion of a VLAN transparent tag, and forwards the packet after the processing from an appropriate port (a port determined according to a processing rule) via the communication control unit 31.

FIG. 6 is a diagram showing an example of a flow table contained in the storage unit 33 of the forwarding apparatus 30-1. FIG. 6 shows an example of a VLAN transparent setting for realizing the virtual network (virtual network passing over a domain; ID=100) described with reference to FIG. 2.

The first line of FIG. 6 has a processing rule by which the forwarding apparatus 30-1 forwards a packet to a forwarding apparatus within the network domain 201. The second line of FIG. 6 has a processing rule for when the forwarding apparatus 30-1 receives a packet from a forwarding apparatus within the network domain 201.

The first line of FIG. 6 describes a match condition for identifying a packet having a VLAN tag in which 100 is set in the VLAN ID. Processing content (Instructions) in the first line of FIG. 6 describe processing for inserting a VLAN transparent tag in which VTID=ID1, and processing for forwarding a received packet from port P1.

On the second line of FIG. 6, a match condition is set for identifying a packet in which is inserted a VLAN transparent tag in which ID1 is set in the VTID by a forwarding apparatus of the network domain 201. Processing content (Instructions) in the second line of FIG. 6 describe processing for removing the VLAN transparent tag (removal processing) and processing for forwarding a received packet from port P3.

The processing rule shown in FIG. 6 is one example of a processing rule set in the forwarding apparatus 30-1, but a similar processing rule in which a forwarding destination port or receiving port is changed as appropriate, is set for the forwarding apparatus 30-2 also.

Figure 7:
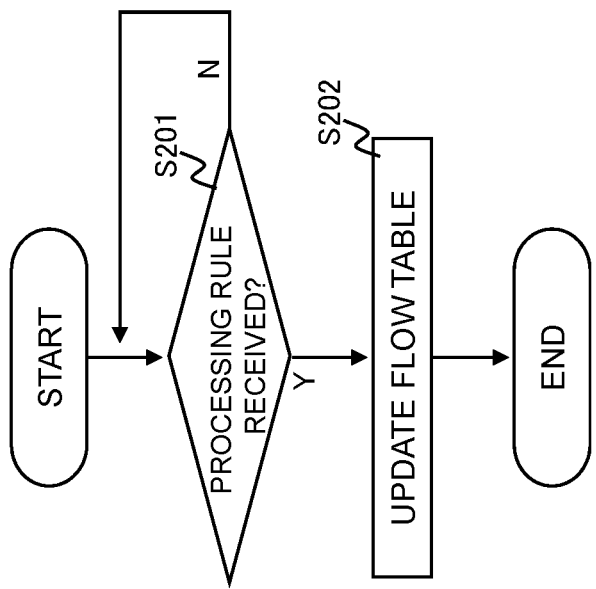
FIG. 7 is a flowchart showing an example of operations of the forwarding apparatus.
Figure 8:
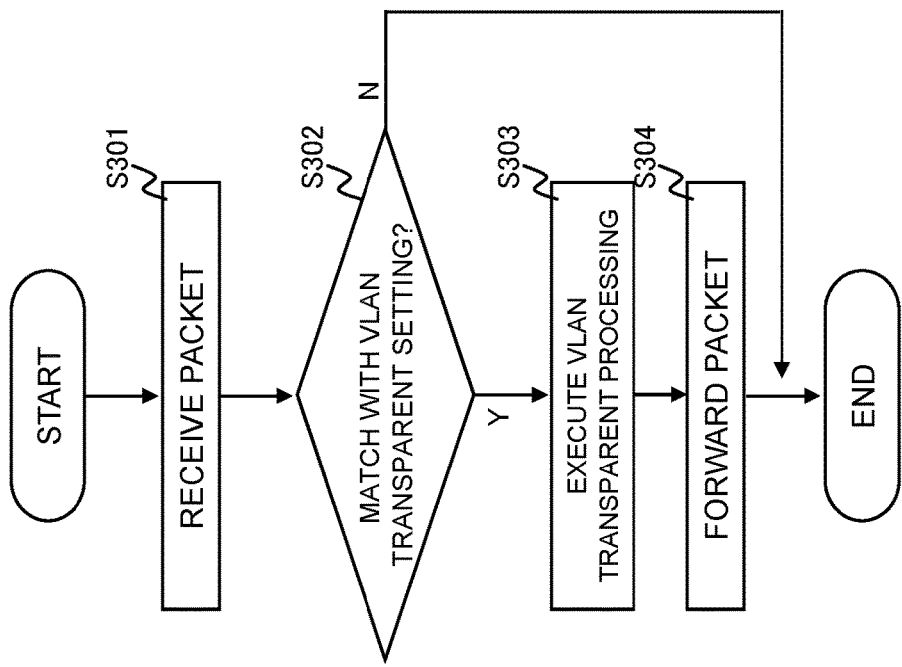
FIG. 8 is a flowchart showing an example of operations of the forwarding apparatus.

Operations of the forwarding apparatus 30 are consolidated in the flowcharts shown in FIG. 7 and FIG. 8.

Referring to FIG. 7, the table management unit 32 waits to receive a message related to a processing rule (VLAN transparent setting) from the control apparatus 20 (step S201).

On receiving the VLAN transparent setting (step S201, Yes branch), the table management unit 32 stores the setting in the storage unit 33 and updates the flow table (step S202).

Referring to FIG. 8, the forwarding apparatus 30 receives a packet (step S301). The forwarding processing unit 34 determines whether or not the received packet matches a match condition stored in the flow table (whether compatible with the VLAN transparent setting) (step S302). Specifically, matching between the match condition of the VLAN transparent setting and the received packet, is confirmed in the forwarding apparatuses 30-1 and 30-2.

If the received packet and the match condition of the VLAN transparent setting match (step S302, Yes branch), the forwarding processing unit 34 executes VLAN transparent processing (insertion or removal of the VLAN transparent tag) (step S303). The forwarding apparatus 30 forwards the packet for which the VLAN transparent processing is performed, from a port determined by the VLAN transparent setting (step S304). Specifically, the communication control unit 31 transmits the packet in accordance with an Ethernet frame.

As described above, the communication system according to the first exemplary embodiment sets a processing rule (VLAN transparent setting), in the forwarding apparatus, for inserting or removing a VLAN transparent tag, for a packet contained in the virtual network for passing over a domain. As a result, the forwarding apparatus located at an end point can realize communication between VLANs passing over the domain, by performing simple processing of inserting the VLAN transparent tag into a header of the packet. That is, in the forwarding apparatus according to the first exemplary embodiment, processing to change the VLAN tag is unnecessary and its load is reduced.

Furthermore, there is no need for respective forwarding apparatuses to hold a lot of information (for the abovementioned example, VLAN ID, virtual network ID, virtual forwarding apparatus ID, forwarding port), and it is possible to effectively use resources of the respective forwarding apparatuses.

Some of all of the abovementioned exemplary embodiments may also be described as in the following modes, but there is no limitation to the following.

<First Mode>

A communication system including: first and second forwarding apparatuses located at end points of a network, and a control apparatus that controls the first and second forwarding apparatuses and constructs a virtual network, wherein the control apparatus sets in the first forwarding apparatus, a first processing rule such that, when the first forwarding apparatus receives a packet into which is inserted a first tag that includes an identifier for identifying the virtual network, the first forwarding apparatus inserts a second tag into the received packet and sends the received packet from a prescribed port, and, sets in the second forwarding apparatus, a second processing rule such that, when the second forwarding apparatus receives the packet into which is inserted the second tag, the second forwarding apparatus removes the second tag and sends from a prescribed port.

<Second Mode>

The communication system according to the first mode wherein the setting unit sets the second processing rule for the first forwarding apparatus, and sets the first processing rule for the second forwarding apparatus.

<Third Mode>

The communication system according to the first or second mode, wherein the setting unit sets: an identifier of a virtual forwarding apparatus virtually constructed inside the network, in the second tag using the first processing rule, and a third processing rule for sending a packet in which the identifier of the virtual forwarding apparatus is set in the second tag, from a prescribed port, in the forwarding apparatus inside the network, when a forwarding apparatus receives a packet in which the identifier of the virtual forwarding apparatus is set in the second tag.

<Fourth Mode>

A control apparatus that constructs a virtual network by controlling a first forwarding apparatus located at an end point of a network and a second forwarding apparatus located at an end point of the network, wherein the control apparatus sets, in the first forwarding apparatus, a first processing rule such that, when the first forwarding apparatus receives a packet into which is inserted a first tag that includes an identifier for identifying the virtual network, the first forwarding apparatus inserts a second tag into the received packet and sends the received packet from a prescribed port, and, in the second forwarding apparatus, a second processing rule such that, when the second forwarding apparatus receives the packet into which is inserted the second tag, the second forwarding apparatus removes the second tag and sends from a prescribed port.

<Fifth Mode>

The control apparatus according to the fourth mode wherein the setting unit sets the second processing rule for the first forwarding apparatus, and sets the first processing rule for the second forwarding apparatus.

<Sixth Mode>

The control apparatus according to the fourth or fifth mode, wherein the setting unit sets: an identifier of a virtual forwarding apparatus virtually constructed inside the network, in the second tag, and a third processing rule for sending a packet in which the identifier of the virtual forwarding apparatus is set in the second tag, from a prescribed port, in the forwarding apparatus inside the network, when a forwarding apparatus receives a packet in which the identifier of the virtual forwarding apparatus is set in the second tag.

<Seventh Mode>

A control method for a control apparatus that constructs a virtual network by controlling a first forwarding apparatus located at an end point of a network and a second forwarding apparatus located at an end point of the network, including setting, in the first forwarding apparatus, a first processing rule such that, when the first forwarding apparatus receives a packet into which is inserted a first tag that includes an identifier for identifying the virtual network, the first forwarding apparatus inserts a second tag into the received packet and sends the received packet from a prescribed port, and setting, in the second forwarding apparatus, a second processing rule such that, when the second forwarding apparatus receives the packet into which is inserted the second tag, the second forwarding apparatus removes the second tag and sends from a prescribed port.

<Eighth Mode>

A program that executes, on a computer installed in a control apparatus that constructs a virtual network by controlling a first forwarding apparatus located at an end point of a network and a second forwarding apparatus located at an end point of the network, a process that sets, in the first forwarding apparatus, a first processing rule such that, when the first forwarding apparatus receives a packet into which is inserted a first tag that includes an identifier for identifying the virtual network, the first forwarding apparatus inserts a second tag into the received packet and sends the received packet from a prescribed port, and a process that sets, in the second forwarding apparatus, a second processing rule such that, when the second forwarding apparatus receives the packet into which is inserted the second tag, the second forwarding apparatus removes the second tag and sends from a prescribed port.

It is to be noted that the seventh and eighth modes may be expanded with regard to the fifth and sixth modes, similar to the fourth mode.

It is to be noted that the various disclosures of the cited Patent Literature described above are incorporated herein by reference thereto. Modifications and adjustments of exemplary embodiments and examples may be made within the bounds of the entire disclosure (including the scope of the claims) of the present invention, and also based on fundamental technological concepts thereof. Various combinations and selections of various disclosed elements (including respective elements of the respective claims, respective elements of the respective exemplary embodiments and examples, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 10-1, 10-2 terminal
20, 101 control apparatus
21 virtual network control unit (controller)
22, 33 storage unit
23, 31 communication control unit (controller)
30, 30-1, 30-2, 100-1, 100-2 forwarding apparatus
32 table management unit (manager)
34 forwarding processing unit (processor)
40 virtual forwarding apparatus
102 setting unit (setter)
121 forwarding path calculation unit (calculator)
122 processing rule setting unit (setter)
141 table retrieval unit (retriever)
142 action execution unit (executor)
201 network domain

The invention claimed is:

1. A communication system, comprising:
first and second forwarding apparatuses located at end points of a network, wherein
said first and second forwarding apparatuses forward a packet in accordance with a first processing rule and a second processing rule, and
a packet forwarding path is calculated based on information of a virtual network and information of said network; and
a control apparatus that controls said first and second forwarding apparatuses and constructs said virtual network,
wherein said control apparatus sets:
in said first forwarding apparatus, said first processing rule such that, when said first forwarding apparatus receives said packet into which is inserted a first tag including an identifier for identifying said virtual network, said first forwarding apparatus inserts a second tag into said received packet and sends said received packet from a first prescribed port,
in said second forwarding apparatus, said second processing rule such that, when said second forwarding apparatus receives said packet into which is inserted said second tag, said second forwarding apparatus removes said second tag and sends from a second prescribed port, an identifier of a virtual forwarding apparatus virtually constructed inside said network, in said second tag using said first processing rule, and a third processing rule for sending said packet in which said identifier of said virtual forwarding apparatus is set in said second tag, from a third prescribed port, in said virtual forwarding apparatus inside said network, when said virtual forwarding apparatus receives said packet in which said identifier of said virtual forwarding apparatus is set in said second tag.

2. The communication system according to claim 1, wherein said control apparatus sets said second processing rule for said first forwarding apparatus, and sets said first processing rule for said second forwarding apparatus.

3. A control apparatus, comprising a controller and a non-transitory computer-readable recording medium, configured to construct a virtual network by controlling a first forwarding apparatus located at a first end point of a network and a second forwarding apparatus located at a second end point of said network, wherein said first and second forwarding apparatuses forward a packet in accordance with a first processing rule and a second processing rule, and a packet forwarding path is calculated based on information of said virtual network and information of said network, and said control apparatus sets:

in said first forwarding apparatus, the first processing rule such that, when said first forwarding apparatus receives said packet into which is inserted a first tag including an identifier for identifying said virtual network, said first forwarding apparatus inserts a second tag into said received packet and sends said received packet from a first prescribed port, in said second forwarding apparatus, the second processing rule such that, when said second forwarding apparatus receives said packet into which is inserted said second tag, said second forwarding apparatus removes said second tag and sends from a second prescribed port, an identifier of a virtual forwarding apparatus virtually constructed inside said network, in said second tag using said first processing rule, and a third processing rule for sending said packet in which said identifier of said virtual forwarding apparatus is set in said second tag, from a third prescribed port, in said virtual forwarding apparatus inside said network, when said virtual forwarding apparatus receives said packet in which said identifier of said virtual forwarding apparatus is set in said second tag.

4. The control apparatus according to claim 3, wherein said control apparatus sets said second processing rule for said first forwarding apparatus, and sets said first processing rule for said second forwarding apparatus.

5. A control method for a control apparatus configured to construct a virtual network by controlling a first forwarding apparatus located at a first end point of a network and a second forwarding apparatus located at a second end point of said network, wherein said first and second forwarding apparatuses forward a packet in accordance with a first processing rule and a second processing rule, and a packet forwarding path is calculated based on information of said virtual network and information of said network; and said method comprising:

setting, in said first forwarding apparatus, said first processing rule such that, when said first forwarding apparatus receives said packet into which is inserted a first tag including an identifier for identifying said virtual network, said first forwarding apparatus inserts a second tag into said received packet and sends said received packet from a first prescribed port, setting, in said second forwarding apparatus, said second processing rule such that, when said second forwarding apparatus receives said packet into which is inserted said second tag, said second forwarding apparatus removes said second tag and sends from a second prescribed port, setting an identifier of a virtual forwarding apparatus virtually constructed inside said network, in said second tag using said first processing rule, and setting a third processing rule for sending said packet in which said identifier of said virtual forwarding apparatus is set in said second tag, from a third prescribed port, in said virtual forwarding apparatus inside said network, when said virtual forwarding apparatus receives said packet in which said identifier of said virtual forwarding apparatus is set in said second tag.

6. A non-transitory computer-readable recording medium storing a program that executes on a computer installed in a control apparatus configured to construct a virtual network by controlling a first forwarding apparatus located at a first end point of a network and a second forwarding apparatus located at a second end point of said network, wherein said first and second forwarding apparatuses forward a packet in accordance with a first processing rule and a second processing rule, and a packet forwarding path is calculated based on information of said virtual network and information of said network; and said programming executing:

a process that sets, in said first forwarding apparatus, a first processing rule such that, when said first forwarding apparatus receives a packet into which is inserted a first tag including an identifier for identifying said virtual network, said first forwarding apparatus inserts a second tag into said received packet and sends said received packet from a first prescribed port, a process that sets, in said second forwarding apparatus, a second processing rule such that, when said second forwarding apparatus receives said packet into which is inserted said second tag, said second forwarding apparatus removes said second tag and sends from a second prescribed port, a process that sets an identifier of a virtual forwarding apparatus virtually constructed inside said network, in said second tag using said first processing rule, and a process that sets a third processing rule for sending said packet in which said identifier of said virtual forwarding apparatus is set in said second tag, from a third prescribed port, in said virtual forwarding apparatus inside said network, when said virtual forwarding apparatus receives said packet in which said identifier of said virtual forwarding apparatus is set in said second tag.

* * * * *